(12) United States Patent
Frank et al.

(10) Patent No.: US 8,160,757 B1
(45) Date of Patent: Apr. 17, 2012

(54) SYSTEM AND METHOD FOR PROVIDING OPTIMUM MULTI-MAP OVERLAY IN A FLIGHT DECK NAVIGATION DISPLAY

(75) Inventors: John C. Frank, Marion, IA (US); Craig D. Pettit, Cedar Rapids, IA (US); James R. McGinnis, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1029 days.

(21) Appl. No.: 11/804,679

(22) Filed: May 18, 2007

(51) Int. Cl.
*G01C 5/00* (2006.01)
*G01C 23/00* (2006.01)

(52) U.S. Cl. ......... 701/9; 701/3; 701/4; 701/11; 701/16; 701/200

(58) Field of Classification Search ................. 701/3, 9, 701/11, 207; 340/970
See application file for complete search history.

(56) References Cited

U.S. PATENT DOCUMENTS

| | | | | |
|---|---|---|---|---|
| 5,160,842 A * | 11/1992 | Johnson | ..................... | 250/338.1 |
| 5,519,392 A * | 5/1996 | Oder et al. | ............... | 340/995.27 |
| 5,557,397 A * | 9/1996 | Hyde et al. | .................... | 356/5.01 |
| 5,936,552 A * | 8/1999 | Wichgers et al. | ............. | 340/963 |
| 6,005,961 A * | 12/1999 | Na | .................. | 382/113 |
| 6,043,756 A * | 3/2000 | Bateman et al. | ............. | 340/945 |
| 6,208,933 B1 * | 3/2001 | Lazar | ............................ | 701/207 |
| 6,212,471 B1 * | 4/2001 | Stiles et al. | .................... | 701/207 |
| 6,216,065 B1 * | 4/2001 | Hall et al. | ....................... | 701/16 |
| 6,421,603 B1 * | 7/2002 | Pratt et al. | ..................... | 701/206 |
| 6,452,511 B1 * | 9/2002 | Kelly et al. | .................... | 340/970 |
| 6,525,674 B1 * | 2/2003 | Kelly et al. | .................... | 340/970 |
| 6,567,014 B1 * | 5/2003 | Hansen et al. | ................ | 340/980 |
| 6,597,294 B1 * | 7/2003 | Ariens | ..................... | 340/995.26 |
| 6,690,299 B1 * | 2/2004 | Suiter | .......................... | 340/973 |
| 6,828,922 B1 * | 12/2004 | Gremmert et al. | ........... | 340/949 |
| 6,980,892 B1 * | 12/2005 | Chen et al. | ........................ | 701/9 |
| 7,363,121 B1 * | 4/2008 | Chen et al. | ........................ | 701/9 |
| 7,386,373 B1 * | 6/2008 | Chen et al. | ........................ | 701/9 |
| 7,599,766 B2 * | 10/2009 | Ardila et al. | ...................... | 701/3 |
| 7,668,625 B2 * | 2/2010 | Bitar et al. | ........................ | 701/1 |
| 7,698,058 B2 * | 4/2010 | Chen et al. | ..................... | 701/207 |
| 2003/0003872 A1 * | 1/2003 | Brinkley et al. | ................ | 455/66 |
| 2003/0016158 A1 * | 1/2003 | Stayton et al. | .................. | 342/29 |
| 2003/0193410 A1 * | 10/2003 | Chen et al. | ..................... | 340/971 |
| 2003/0222887 A1 * | 12/2003 | Wilkins et al. | ............... | 345/618 |
| 2005/0024237 A1 * | 2/2005 | Gannett | ........................ | 340/967 |
| 2005/0065671 A1 * | 3/2005 | Horvath et al. | ................... | 701/3 |
| 2006/0004497 A1 * | 1/2006 | Bull | ................................ | 701/10 |
| 2006/0247828 A1 * | 11/2006 | Ardila et al. | ...................... | 701/3 |
| 2007/0050101 A1 * | 3/2007 | Sacle et al. | ..................... | 701/11 |
| 2007/0150117 A1 * | 6/2007 | Bitar et al. | ........................ | 701/1 |

(Continued)

*Primary Examiner* — Khoi Tran
*Assistant Examiner* — Ian Jen
(74) *Attorney, Agent, or Firm* — Donna P. Suchy; Daniel M. Barbieri

(57) ABSTRACT

The present invention is a method for providing optimum multi-map overlay in a flight deck navigation display of an aircraft. The method includes outputting absolute terrain data to the navigation display for display by the navigation display. The method further includes receiving a threshold elevation input, the threshold elevation input including a threshold elevation. The method further includes receiving relative terrain data. The method further includes, when the aircraft is located below the threshold elevation, overlaying the relative terrain data onto the absolute terrain data based on the received threshold elevation input. Further, the absolute terrain data and the relative terrain data are concurrently displayed by the navigation display, the displayed relative terrain data being overlaid onto the displayed absolute terrain data.

15 Claims, 3 Drawing Sheets

U.S. PATENT DOCUMENTS

2008/0103691 A1 * 5/2008 Chen et al. .................... 701/207
2009/0138145 A1 * 5/2009 Meunier et al. .................. 701/9
2009/0157241 A1 * 6/2009 Meunier et al. .................. 701/9

* cited by examiner

SYSTEM AND METHOD FOR PROVIDING OPTIMUM MULTI-MAP OVERLAY IN A FLIGHT DECK NAVIGATION DISPLAY

FIELD OF THE INVENTION

The present invention relates to the field of situational awareness and particularly to a system and method for providing optimum multi-map overlay in a flight deck navigation display.

BACKGROUND OF THE INVENTION

Terrain Awareness and Warning Systems (TAWS) are typically implemented in aircraft in an attempt to reduce instances of Controlled Flight Into Terrain (CFIT), a situation in which an airworthy aircraft, which may be under complete control of the pilot(s) inadvertently flies into terrain, an obstacle (such as a building), or water. TAWS may, for example, use digital elevation data and airplane sensor values to predict if a likely future position of the aircraft intersects with terrain or an obstacle, if so, an alert may be provided via a display system so that corrective action may be taken by the pilot(s) to avoid a collision.

Conventional products may include multiple maps and/or displays for displaying relative terrain data, terrain alert data (ex—cautions/warnings) and/or absolute terrain data. However, effectively displaying the relative terrain data, terrain alert data and the absolute terrain data concurrently in a manner which promotes optimization of situational awareness has proven elusive.

Thus, it would be desirable to provide a system and method for optimum multi-map overlay in flight deck navigation displays which addresses the problems associated with current solutions.

SUMMARY OF THE INVENTION

Accordingly, an embodiment of the present invention is directed to a method for providing optimum multi-map overlay in a flight deck navigation display of an aircraft, including: outputting absolute terrain data to the navigation display for display by the navigation display; receiving a threshold elevation input, the threshold elevation input including a threshold elevation; receiving relative terrain data; and when the aircraft is located below the threshold elevation, overlaying the relative terrain data onto the absolute terrain data based on the received threshold elevation input, wherein the absolute terrain data and the relative terrain data are concurrently displayed by the navigation display, the displayed relative terrain data being overlaid onto the displayed absolute terrain data.

A further embodiment of the present invention is directed to a computer-readable medium having computer-executable instructions for performing a method for providing optimum multi-map overlay in a flight deck navigation display of an aircraft, said method including: outputting absolute terrain data to the navigation display for display by the navigation display; receiving a threshold elevation input, the threshold elevation input including a threshold elevation; receiving relative terrain data; and when the aircraft is located below the threshold elevation, overlaying the relative terrain data onto the absolute terrain data based on the received threshold elevation input, wherein the absolute terrain data and the relative terrain data are concurrently displayed by the navigation display, the displayed relative terrain data being overlaid onto the displayed absolute terrain data.

An additional embodiment of the present invention is directed to a system for providing optimum multi-map overlay for an aircraft, including: a first module, the first module being configured for outputting absolute terrain data; a second module, the second module configured for being communicatively coupled with the first module, the second module further configured for outputting relative terrain data and a threshold elevation; and a navigation display, the navigation display configured for being communicatively coupled with the first module, the navigation display further configured for displaying the absolute terrain data, wherein the navigation display is further configured for displaying relative terrain data when the aircraft is located below a threshold elevation, the relative terrain data being overlaid onto the displayed absolute terrain data by the first module.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
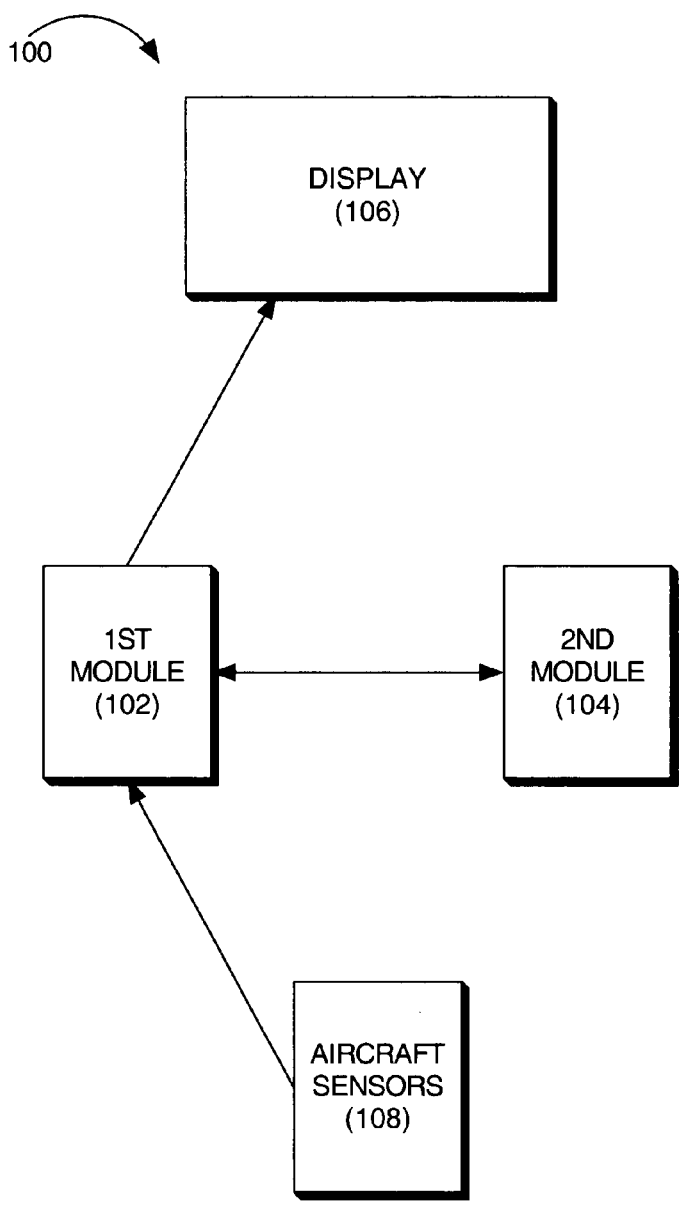
FIG. 1 is a block diagram illustrating a system for providing optimum multi-map overlay for an aircraft in accordance with an exemplary embodiment of the present invention.

FIG. 1 is a block diagram schematic of a system for providing optimum multi-map overlay for an aircraft in accordance with an exemplary embodiment of the present invention. In a current embodiment, the system 100 includes a first module 102 and a second module 104, the modules (102, 104) being communicatively coupled with each other. In a present embodiment, the first module 102 and the second module 104 may be collectively configured for providing Terrain Awareness and Warning System (TAWS) functionality for the aircraft. In further embodiments, the second module 104 may be configured for providing Enhanced Ground Proximity Warning System (EGPWS) functionality for the aircraft. For example, the modules (102, 104) may be implemented as part of a TAWS BRS (Business and Regional Systems) product.

In a current embodiment, the first module 102 may be configured for outputting absolute terrain data. For example, the first module 102 may be a Rockwell Collins® module which may utilize a high resolution database for providing high resolution, absolute terrain data to a navigation display. In exemplary embodiments, when the aircraft is located or descends below a threshold elevation (as detected by aircraft sensors 108, which may be communicatively coupled to the first and/or second modules 102, 104), the second module 104, which may be a Honeywell® module, may be configured for outputting relative terrain data, such as low resolution relative terrain data. For example, the threshold elevation may be two thousand (2,000) feet above terrain. (i.e., the aircraft is 2,000 feet above terrain). For the purposes of this application, terrain may include land, mountains, a body of water such as an ocean or lake, an obstacle such as a building/tower, or the like. In additional embodiments, the relative terrain data output by the second module may include terrain alert data (ex—cautions/warnings).

In an exemplary embodiment, the system 100 further includes a navigation display 106. In a present embodiment, the navigation display 106 and the first module 102 are configured for being communicatively coupled with each other. In a current embodiment, the navigation display 106 is configured for displaying the absolute terrain data provided by the first module 102.

Figure 3:
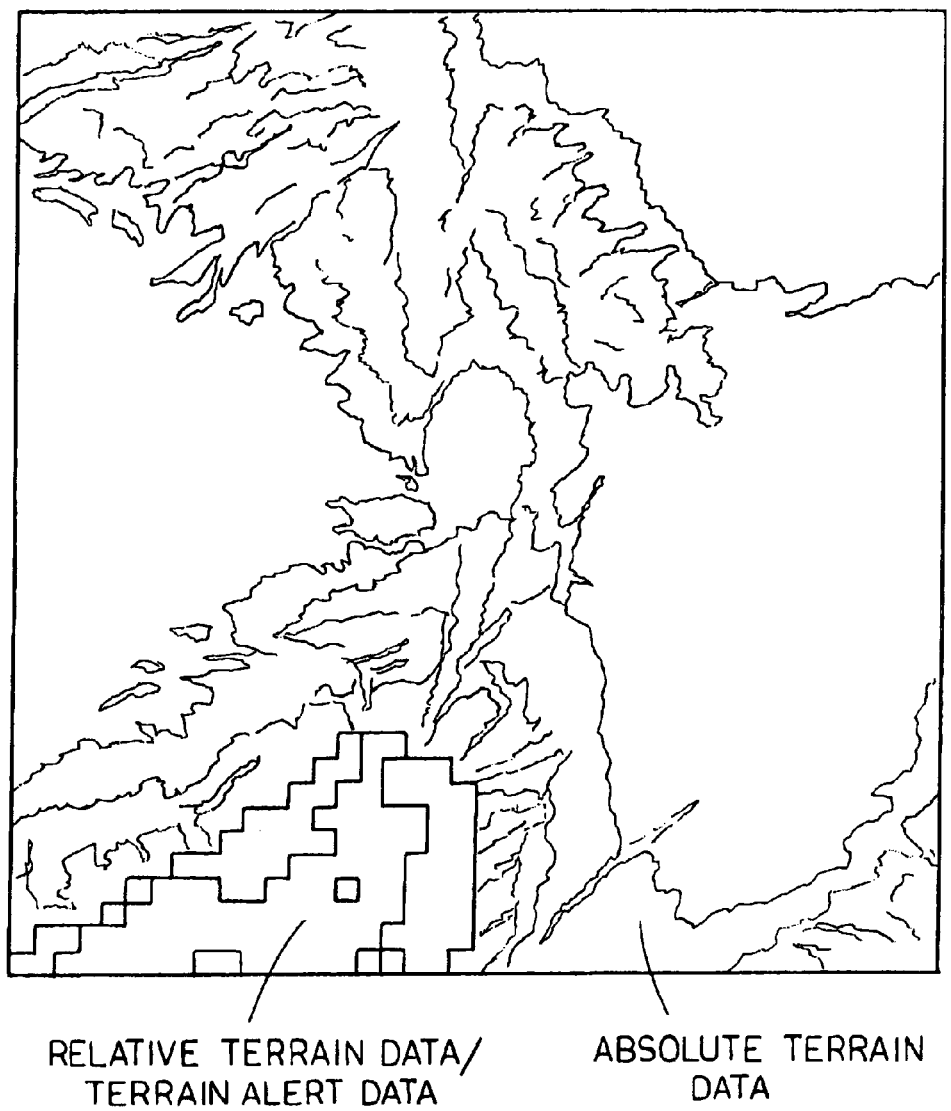
FIG. 3 is an illustration of the displayed relative terrain data shading when overlaid onto the absolute terrain data in accordance with an exemplary embodiment of the present invention.

In a present embodiment, the navigation display 106 may display only the absolute terrain data when the aircraft is located at or above (or ascends to or above) the threshold elevation (ex—2,000 feet above terrain). Alternatively, when the aircraft is located or descends below the threshold elevation, (ex—below 2,000 feet above terrain) the navigation display 106 may be further configured for displaying relative terrain data provided or output by the second module 104, while also displaying the absolute terrain data provided or output by the first module 102, thereby promoting improved situational awareness, such as for a pilot or flight crew member who is monitoring the display 106. For example, the displayed relative terrain data may be displayed as relative terrain shading (as shown in FIG. 3) based on the relative terrain data which is output by the second module 104. In an exemplary embodiment, the relative terrain data (ex—the relative terrain shading) may be overlaid onto the already displayed absolute terrain data by the first module 102. For instance, overlaying may involve replacing a displayed color scheme or coloring associated with the already displayed absolute terrain data and displaying in its place a color scheme or coloring associated with the relative terrain data.

In a current embodiment, the navigation display 106, such as when the aircraft is located or descends below the threshold elevation, may be further configured for displaying a caution and/or a warning included in and based upon the relative terrain data which is provided or output by the second module 104, while also displaying the absolute terrain data provided or output by the first module 102. For example, the caution(s) and/or warning(s) may be displayed to indicate positions of hazards (ex—terrain), such as longitudinal values and latitude values. In a present embodiment, the caution(s) and/or warning(s), may be overlaid onto the already displayed absolute terrain data by the first module 102. For instance, overlaying may involve replacing a displayed color scheme or coloring associated with the already displayed absolute terrain data and displaying in its place a color scheme or coloring associated with the cautions/warnings of the relative terrain data.

In an exemplary embodiment, the first module 102 may be configured for scanning output of the second module 104. Further, the first module 102 may be configured for detecting when output of the second module 104 includes terrain alert data (ex—cautions/warnings). Still further, the first module 102 may be configured for determining the positions of the hazards based on the terrain alert data and for placing or overlaying the terrain alert data (ex—the cautions or warnings) over the absolute terrain data. In additional embodiments, when the output of the second module 104 includes terrain alert data, as detected by the first module (102), the system 100 may automatically switch to a ten nautical mile (10 nm) range for hazard detection.

In a present embodiment, the terrain alert data (ex—the cautions and the warnings) may be displayed at a first resolution. For example, the terrain alert data may be displayed as a low resolution cell array, the low resolution cell array being one hundred seventy-six by two hundred sixty-four (176× 264) cells. In a further embodiment, the absolute terrain data may be displayed at a second resolution, the second resolution being higher than the first resolution. For instance, the absolute terrain data may be displayed as a high resolution cell array, the high resolution cell array being six hundred ninety-two by six hundred ninety-two (692×692) cells. Further, each cell of the low resolution cell array may include a color index, the color index being configured for representing and/or being displayed as a color included in the color scheme associated with the relative terrain data (i.e., a relative terrain color). Still further, the color index may be configured for representing and/or being displayed as a color included in the color scheme associated with the terrain alert data (ex—a caution color, an alert color).

In additional embodiments, the second module 104 may be further configured for outputting a threshold elevation(s) and/or a plurality of threshold elevation ranges for dictating which color or color classification of the color scheme associated with the relative terrain data should be displayed. For example, a first threshold elevation range may be two thousand feet (2000 ft) above terrain (example of a top threshold elevation) to one thousand feet (1000 ft) above terrain, and may correspond to a Low Green color/color classification, meaning that when the aircraft is located at a height within the first threshold elevation range above a particular hazard (ex—portion of terrain), then that hazard or portion of terrain should be displayed in Low Green color. In exemplary embodiments, the first module 102 is configured for overlaying the relative terrain data (ex—relative terrain shading) onto the absolute terrain data based on the threshold elevation ranges provided or output by the second module 104, such that the relative terrain data (ex—relative terrain shading) may be displayed as the color dictated by the threshold range, when the aircraft is located at a height within the threshold range. Further examples of threshold elevation ranges may be: one thousand feet (1000 ft) to five hundred feet (500 ft) above terrain, which may correspond to a Medium Green color/color classification; five hundred feet (500 ft) to one thousand feet (1000 ft) below terrain, which may correspond to a Low Yellow color/color classification; one thousand feet (1000 ft) to two thousand feet (2000 ft) below terrain, which may correspond to a Medium Yellow color/color classification; and more than two thousand feet (2000 ft+) below terrain, which may correspond to a Medium Red color/color classification.

Figure 2:
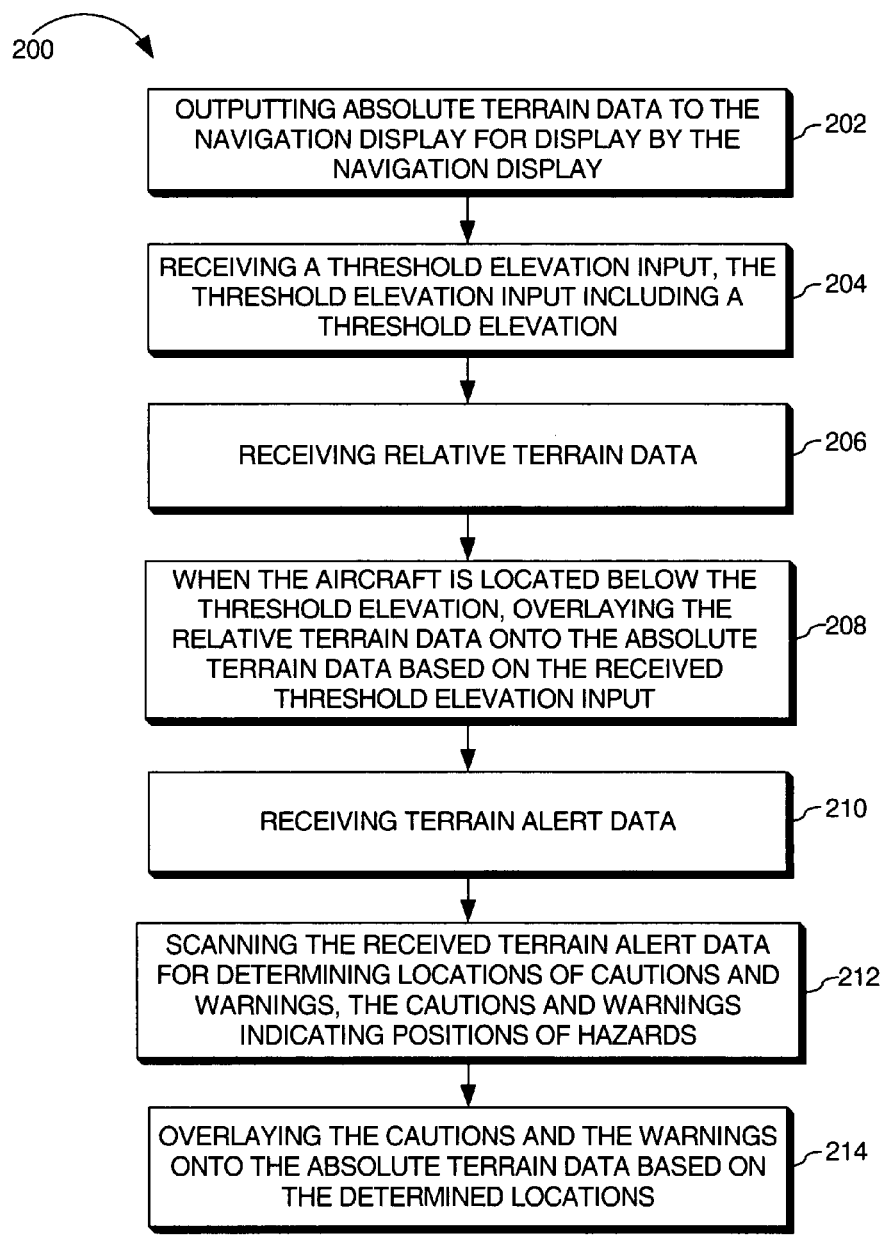
FIG. 2 is a flowchart illustrating a method for providing optimum multi-map overlay in a flight deck navigation display of an aircraft in accordance with an exemplary embodiment of the present invention.

FIG. 2 illustrates a method for providing optimum multi-map overlay in a flight deck navigation display of an aircraft. In a present embodiment, the method 200 may include outputting absolute terrain data to the navigation display for display by the navigation display 202. For example, the first module 102 may be configured for outputting absolute terrain data to the navigation display 106. In further embodiments, the method 200 may further include receiving a threshold elevation input, the threshold elevation input including a threshold elevation 204. For instance, the first module 102 may be configured for receiving the threshold elevation from the second module 104. In exemplary embodiments, the method 200 may further include receiving relative terrain data 206. For example, the first module 102 may be configured for receiving the relative terrain data from the second module 104. In additional embodiments, the method 200 may further include, when the aircraft is located below the threshold elevation, overlaying the relative terrain data (ex—relative terrain shading) onto the absolute terrain data based on the received threshold elevation input 208. For instance, the first module 102 may be configured for overlaying the relative terrain data onto the absolute terrain data. In current embodiments, the absolute terrain data (ex—relative terrain shading) and the relative terrain data are concurrently displayed by the navigation display 106, the displayed relative terrain data (ex—the displayed relative terrain shading) being overlaid onto the displayed absolute terrain data.

In present embodiments, the method 200 may further include, such as when the aircraft is located below the threshold elevation, receiving terrain alert data 210. For instance, the first module 102 may be configured for receiving terrain alert data from the second module 104. In further embodiments, the method 200 may further include scanning the received terrain alert data for determining locations of cautions and warnings, the cautions and warnings indicating positions of hazards 212. For example, the first module 102 may be configured for scanning the received terrain alert data and for determining locations of cautions and/or warnings embedded in the terrain alert data. In an exemplary embodiment, the method 200 may further include overlaying all of the cautions and warnings onto the absolute terrain data based on the determined locations 214. For instance, the first module 102 may be configured for overlaying the cautions and/or warnings onto the absolute terrain data. In additional embodiments, the absolute terrain data and the cautions and warnings are concurrently displayed by the navigation display, the displayed cautions and warnings being overlaid onto the displayed absolute terrain data. In current embodiments, the cautions and warnings are displayed at a first resolution and the absolute terrain data is displayed at a second resolution, the second resolution being higher than the first resolution.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing optimum multi-map overlay in a system of an aircraft, comprising:
   outputting absolute terrain data via a first module of the system to a navigation display of the system for display by the navigation display;
   receiving a threshold elevation input, the threshold elevation input including a threshold elevation, said threshold elevation being a threshold distance above terrain for the aircraft;
   when the aircraft is located below the threshold elevation, outputting relative terrain data via a second module of the system, the second module being communicatively coupled with the first module; and
   when the aircraft is located below the threshold elevation, overlaying the relative terrain data onto the absolute terrain data based on the received threshold elevation input, the absolute terrain data and the relative terrain data being concurrently displayed by the navigation display when the aircraft is located below the threshold elevation, the displayed relative terrain data being overlaid onto the displayed absolute terrain data,
   wherein the overlaid relative terrain data is removed and only the absolute terrain data is displayed via the navigation display when the aircraft has changed its current location from being located below the threshold elevation to being located above the threshold elevation,
   wherein the first module scans the relative terrain data which is output by the second module and determines positions of hazards based on the relative terrain data.

2. A method as claimed in claim 1, wherein the displayed relative terrain data is displayed as relative terrain shading.

3. A method as claimed in claim 2, further comprising:
   scanning the received relative terrain data for determining locations of cautions and warnings, the cautions and warnings indicating positions of hazards.

4. A method as claimed in claim 3, further comprising:
   overlaying the cautions and the warnings onto the absolute terrain data based on the determined locations.

5. A method as claimed in claim 4, wherein the absolute terrain data and the cautions and warnings are concurrently displayed by the navigation display, the displayed cautions and warnings being overlaid onto the displayed absolute terrain data.

6. A method as claimed in claim 5, wherein the cautions and the warnings are displayed at a first resolution and the absolute terrain data is displayed at a second resolution, the second resolution being higher than the first resolution.

7. A non-transitory computer-readable medium having computer-executable instructions for performing a method for providing optimum multi-map overlay in a system of an aircraft, said method comprising:
   outputting absolute terrain data via a first module of the system to a navigation display of the system for display by the navigation display;
   receiving a threshold elevation input, the threshold elevation input including a threshold elevation, said threshold elevation being a threshold distance above terrain for the aircraft;
   when the aircraft is located below the threshold elevation, outputting relative terrain data via a second module of the system, the second module being communicatively coupled with the first module; and when the aircraft is located below the threshold elevation, overlaying the relative terrain data onto the absolute terrain data based on the received threshold elevation input, the absolute terrain data and the relative terrain data being concurrently displayed by the navigation display when the aircraft is located below the threshold elevation, the displayed relative terrain data being overlaid onto the displayed absolute terrain data, wherein the overlaid relative terrain data is removed and only the absolute terrain data is displayed via the navigation display when the aircraft has changed its current location from being located below the threshold elevation to being located above the threshold elevation, wherein the first module scans the relative terrain data which is output by the second module and determines positions of hazards based on the relative terrain data.

8. A non-transitory computer-readable medium having computer-executable instructions for performing a method for providing optimum multi-map overlay in a flight deck navigation display of an aircraft as claimed in claim 7, wherein the displayed relative terrain data is displayed as relative terrain shading.

9. A non-transitory computer-readable medium having computer-executable instructions for performing a method for providing optimum multi-map overlay in a flight deck navigation display of an aircraft as claimed in claim 8, said method further comprising:

scanning the received relative terrain data for determining locations of cautions and warnings, the cautions and warnings indicating positions of hazards.

10. A non-transitory computer-readable medium having computer-executable instructions for performing a method for providing optimum multi-map overlay in a flight deck navigation display of an aircraft as claimed in claim 9, said method further comprising:

overlaying the cautions and the warnings onto the absolute terrain data based on the determined locations.

11. A non-transitory computer-readable medium having computer-executable instructions for performing a method for providing optimum multi-map overlay in a flight deck navigation display of an aircraft as claimed in claim 10, wherein the absolute terrain data and the cautions and warnings are concurrently displayed by the navigation display, the displayed cautions and warnings being overlaid onto the displayed absolute terrain data.

12. A non-transitory computer-readable medium having computer-executable instructions for performing a method for providing optimum multi-map overlay in a flight deck navigation display of an aircraft as claimed in claim 11, wherein the cautions and the warnings are displayed at a first resolution and the absolute terrain data is displayed at a second resolution, the second resolution being higher than the first resolution.

13. A system for providing optimum multi-map overlay for an aircraft, comprising:

a first module, the first module being configured for outputting absolute terrain data;

a second module, the second module configured for being communicatively coupled with the first module, the second module further configured for outputting relative terrain data and a threshold elevation, said threshold elevation being a threshold distance above terrain for the aircraft; and a navigation display, the navigation display configured for being communicatively coupled with the first module, the navigation display further configured for displaying the absolute terrain data, the navigation display being further configured for displaying relative terrain data when the aircraft is located below the threshold elevation, the relative terrain data being overlaid onto the displayed absolute terrain data by the first module, wherein the overlaid relative terrain data is removed and only the absolute terrain data is displayed via the navigation display when the aircraft has changed its current location from being located below the threshold elevation to being located above the threshold elevation, wherein the first module is further configured for scanning the output relative terrain data of the second module and determining the positions of hazards based on the relative terrain data.

14. A system as claimed in claim 13, wherein the display is further configured for displaying cautions and warnings based on the output of the relative terrain data from the second module, the cautions and the warnings being overlaid onto the displayed absolute terrain data by the first module, the cautions and warnings indicating positions of hazards.

15. A system as claimed in claim 13, wherein the displayed relative terrain data is displayed as relative terrain shading.

\* \* \* \* \*